United States Patent
Guan et al.

(10) Patent No.: US 9,355,019 B2
(45) Date of Patent: May 31, 2016

(54) METHOD FOR TEST CASE REDUCTION BASED ON PROGRAM BEHAVIOR SLICES

(71) Applicant: XI'AN JIAOTONG UNIVERSITY, Xi'an (CN)

(72) Inventors: Xiaohong Guan, Xi'an (CN); Qinghua Zheng, Xi'an (CN); Ting Liu, Xi'an (CN); Haijun Wang, Xi'an (CN)

(73) Assignee: XI'AN JIAOTONG UNIVERSITY, Xi'an (CN)

(*) Notice: Subject to any disclaimer, the term of this patent is extended or adjusted under 35 U.S.C. 154(b) by 0 days.

(21) Appl. No.: 14/761,617

(22) PCT Filed: Nov. 7, 2013

(86) PCT No.: PCT/CN2013/086709
§ 371 (c)(1),
(2) Date: Jul. 16, 2015

(87) PCT Pub. No.: WO2015/054938
PCT Pub. Date: Apr. 23, 2015

(65) Prior Publication Data
US 2015/0363305 A1    Dec. 17, 2015

(30) Foreign Application Priority Data
Oct. 14, 2013    (CN) .......................... 2013 1 0479195

(51) Int. Cl.
*G06F 9/44*    (2006.01)
*G06F 11/36*    (2006.01)

(52) U.S. Cl.
CPC ........ *G06F 11/3688* (2013.01); *G06F 11/3604* (2013.01); *G06F 11/3684* (2013.01)

(58) Field of Classification Search
None
See application file for complete search history.

(56) References Cited

U.S. PATENT DOCUMENTS

| 5,161,216 A | * | 11/1992 | Reps | .......................... G06F 8/75 717/151 |
| 2010/0287534 A1 | * | 11/2010 | Vangala | .............. G06F 11/3612 717/124 |
| 2011/0239203 A1 | | 9/2011 | Sukumaran et al. | |

FOREIGN PATENT DOCUMENTS

| CN | 101714119 A | 5/2010 |
| CN | 101901188 A | 12/2010 |

* cited by examiner

*Primary Examiner* — Qamrun Nahar
(74) *Attorney, Agent, or Firm* — Gokalp Bayramoglu

(57) ABSTRACT

The present invention provides a method of test cases reduction based on program behavior slices. In the present invention, during a static analysis stage, analyzing a control flow and an information flow of a program according to input program codes, extracting control dependence and data dependence of the program; calculating potential dependence of the program according to the control dependence and the data dependence of the program; on the basis of the control dependence, the data dependence and the potential dependence, constructing combination dependence of the program; during a dynamic execution stage, according to an execution path and the dependence relation, calculating program behavior slices covered by the path and program behavior slices uncovered by the path, and guiding symbolic execution to generate a path capable of covering new program slices according to the uncovered program behavior slices.

7 Claims, 4 Drawing Sheets

```
void Test(int x, int y, int z, int m)
1   int a=0;
2   int b=1;
3   int c=2;
4   int d=3;
5   int first_out, second_out;
6   if (x + y < 0)
7       a = 1;
8   if (z > 0)
9       b = 2;
10  if (x - y > 1)
11      c = a * b;
12  if (m > 2)
13      d=4;
14  first_out=c;
15  second_out=d;
```

Fig. 5

METHOD FOR TEST CASE REDUCTION BASED ON PROGRAM BEHAVIOR SLICES

TECHNICAL FIELD

The present invention relates to the field of trusted software and software testing, and in particular to a method of test cases reduction in model checking and program control flow analysis.

BACKGROUND ART

Software testing is a basic technique to guarantee the quality of the software, and is also a process consuming most labor and resources in software development. Generally, input space of the program could often be huge or even infinite, such that the tester is unable to complete all the test cases in the limited time. Therefore, it is the most essential demand and problem to selectively generate the effective test cases in the software testing. The traditional method for selectively generating test cases mainly comprises code coverage, branch coverage and path coverage.

Test case generation methods based on the code coverage and the branch coverage has been widely used in industry. However, in comparison with random case generation method, the two methods have no statistical advantage in the detection of program errors.

Test case generation method based on the path coverage has significantly developed recently. Various tools, such as JPF-SE, Concolic and KLEE, continually arise, but all of them confront a problem of program state space explosion. The test case generation tools of the path coverage are all achieved based on symbolic execution. The symbolic execution, a program verification method advanced in the seventies of the twentieth century, is a kind of model checking method based symbolization. The symbolic execution may be widely used in symbolic debugging, test case generation and so on. The main idea of symbolic execution resides in that inputs are replaced with symbolic values and variable values in program are also expressed by symbolic expression. Finally, output values of the program may be transformed to a function with the symbolic values as inputs. The symbolic execution may abstract the program as a symbolic execution tree, wherein a sequential statement corresponds to a computational node of the tree, a branch statement corresponds to a branch node, and a loop statement is expanded to a semantically equivalent branch statement according to the number of loops. Generally speaking, one loop statement corresponds to a set of branch nodes. It could be assumed that the program only has two structures, namely sequential structure and branch structure, during the symbolic execution. The process of the symbolic execution substantially is a process of constructing a path condition. The path condition refers to a constraint condition which is necessarily satisfied by program input values for the test case to execute that path. Therefore, one path condition uniquely corresponds to an execution path. One path condition consists of a set of sub-conditions, and each condition of executed branch may serve as a sub-condition. The path condition initially is "true". In the process of exploring the program, the path condition may be updated each time one branch statement occurs, and the condition of executed branch may be added to the path condition, wherein its formula is PC=PC^ new sub-condition. Each branch statement corresponds to two branches, namely "true" and "false", while the symbolic execution is based on static analysis and variable has no specific value, such that it is unable to ensure the branch to be executed. Therefore, exploration will be made to the two branches (searching sequence could be defined on demand, such as an order of depth first or breadth first). That is, the conditions of two branches may serve as sub-condition to update the path condition. In such a manner, two new path conditions which correspond to two different execution paths could be achieved. Subsequently, exploration is continuously made to the two paths, respectively. The symbolic execution may achieve an overall path exploration of the program. The path conditions of all the execution paths of the program may be obtained when the program exploration is completed. Finally, all the obtained path conditions may be checked. If a path condition could not be satisfied, then this path is supposed to be an infeasible path. If a path condition could be satisfied, then this path is supposed to be feasible path. The path conditions are then passed to a constraint solver and configure out the corresponding test cases.

The symbolic execution has following two deficiencies which make it difficult to be large-scale applied. 1) The symbolic execution is a traversal algorithm based on search, which needs to traverse all branches of the program, such that although an optimization could be performed by some additional pruning conditions, the algorithm is highly complicated, i.e., $O(2^n)$ wherein n is the number of conditional statements (inclusive of branch, loop and logistic operations) in the program. 2) The symbolic execution could not properly solve the problem of updating the test suite, and in particular, each time codes are modified, the symbolic execution tree would be re-traversed to generate a new test suite. As it could be seen from foregoing analysis, regeneration of a test suite may have a great amount of time expenditure. Moreover, software would be modified frequently; if a new test suite is generated by the symbolic execution after each modification, test efficiency will be influenced.

If a method for generating test cases is able to cover the same program behaviors as entire paths and avoid enumerating entire program paths, the efficiency of software testing would be greatly improved.

SUMMARY OF THE INVENTION

The present invention discloses a method of test cases reduction based on program behavior slices. In the case that there is no need to scan all program paths, a test suite capable of covering all program behaviors is generated to relieve the state-space explosion problem confronted by program tests.

In order to achieve above objective, the present invention employs the following technical solutions.

The method of test cases reduction based on program behavior slices comprises:

S1) according to under the test program and through using a static program analysis technique, analyzing control flow and information flow of the program and extracting control dependence and data dependence of the program;

S2) according to the control dependence and the data dependence of the program, calculating potential dependence of the program;

S3) according to the control dependence, the data dependence and the potential dependence of the program, constructing combination dependence of the program in the control flow graph;

S4) randomly generating an initial path by using a symbolic execution method, and storing a test case corresponding to the initial path to a valid test suite;

S5) calculating program behavior slices covered by the new path wherein the initial path is executed at the first time, and the calculation includes: for each branch node executed by the path, calculating the program behavior slices on the path, wherein the program behavior slices of a node $n_i$ on the path contains all nodes conforming to the following characters: the nodes have an interact relation on the path with the node $n_i$ by the control dependence, the data dependence, the potential dependence, the combination dependence or their transition;

S6) calculating program behavior slices uncovered by the new path wherein the initial path is executed at the first time, and the calculation includes: according to the dependence relation, calculating all the branches required to be negated on the path and calculating the program behavior slices of the negated branches on the path;

S7) updating uncovered program behavior slices, including: deleting the program behavior slices covered by the new path and adding program behavior slices uncovered by the new path;

S8) if the uncovered program behavior slice is null, i.e., there are no uncovered program behavior slices, going to Step S10); otherwise, going to Step S9);

S9) selecting one piece of program behavior slices from the uncovered program behavior slices according to breadth first algorithm, guiding symbolic execution to generate a test path, if the test path is valid, storing its corresponding test case to the test suite and going to the Step S5); if no valid path is generated, deleting the selected program behavior slice from the uncovered program behavior slices and going to the Step S8); and S10) outputting the valid test suite which covers all the program behavior slices of the program.

Further improvement of the present invention is in that, the potential dependence in the Step S2) is defined as follows: when a conditional statement s1 and a statement s2 simultaneously conform to the following requirements, there exists the potential dependence between the conditional statement s1 and the statement s2: 1) when the conditional statement s1 invokes a branch br, a statement s'1 satisfies with a requirement in which there exists the direct or indirect control dependence between the statement s1 and the statement s'1 through the branch br and there exists the data dependence between the statement s'1 and the statement s2; 2) when the conditional statement s1 invokes a negated branch br' of the branch br, no statement s'1 satisfies with a requirement in which there exists the direct or indirect control dependence between the statement s1 and the statement s'1 through the branch br' and there exists the data dependence between the statement s'1 and the statement s2, wherein the control dependence and the data dependence describe an influence on the statement s2 when the statement s1 is executed, while the potential dependence indicates an influence on the statement s2 when the non-execution of the statement s'1 is controlled by the statement s1. The program execution failure can be resulted from not only the execution of certain statements, but also from the non-execution of certain statements which are necessary.

Further improvement of the present invention is in that, the combination dependence in the Step S3) is defined as follows: when a statement s1 and a statement s2 simultaneously conform to the following three requirements, there exists the combination dependence between the statement s1 and the statement s2: 1) there is a path from the statement s1 through the statement s2 to a statement s3; 2) on the path, there exists the dynamic data dependence, the potential dependence or the combination dependence between the statement s1 and the statement s3; 3) on the path, there exists the dynamic control, the data dependence, the potential dependence or the combination dependence between the statement s2 and the statement s3. The combination dependence describes a case in which two statements collectively act on a third statement. Program execution failure commonly in the program test is caused by a cooperation influence of statements having non-control dependence, data dependence or potential dependence.

Further improvement of the present invention is in that, the step, of constructing the combination dependence of the program in the control flow graph in the Step S3) comprises:

S301) on the basis of the data flow analysis method, each statement of the program serving as a node and calculating incoming node set and outgoing node set for each node;

S302) calculating node pairs flowing in at each node, including: calculating the sum of outgoing node pairs of an immediate previous node to the present node;

S303) calculating node pairs generated at each node, in which nodes flowing in the present node are one-to-one combined to form node pairs with the present node; calculating node pairs killed at each node, in which if either one node of the incoming node pair is redefined by the present node, then the node pair redefined by the present node kills hereby;

S304) calculating node pairs flowing out at each node, including: adding generated node pairs to the incoming node pairs at the present node and then subtracting the node pairs killed hereby; and S305) calculating the combination dependence, in which for an incoming node pair at a node, if both nodes of the node pair has the control dependence, the data dependence, the potential dependence or the combination dependence with the present node, then it is considered that both nodes of the node pair have the combination dependence.

Further improvement of the present invention is in that, the program behavior slices in the Step S5) is defined as follows: assuming that an execution path $\epsilon$ and a slice criterion node c on the path are given, the program behavior slice of the node c on the path $\epsilon$ contains nodes conforming to the following characters: the nodes have an interact relation with the node c on the path by the control dependence, the data dependence, the potential dependence, the combination dependence or their transition. The program behavior slice may be used to exactly describe the program behavior. If a failure occurs at a node during the program execution, factors causing the failure reside necessarily in the program behavior slices of the node.

Further improvement of the present invention is in that, the uncovered program behavior slice in the Step S6) is defined as follows: assuming a path and a branch $br_i$ to be negated on the path are given, the program behavior slice, of a branch $br'_i$ negated to the branch $br_i$ on the path constitutes a piece of uncovered program behavior slice; wherein the uncovered program behavior slice can be calculated as follows:

S601) judging whether the path $\epsilon$ is the initial path, if yes, going to Step S602), otherwise going to Step S603);

S602) negating all branches on the path, generating corresponding program behavior slices, and going to Step S605);

S603) if the path $\epsilon$ is generated by guide of the program behavior slices, searching the path $\epsilon$ for a node $n_i$ corresponding to the last node of the program behavior slices;

S604) for an arbitrary branch node $br_i$ on the path $\epsilon$, if there exist the control dependence, the data dependence, the potential dependence, the combination dependence or their transition dependence on the path $\epsilon$ between the nodes $n_i$ and the negated branch $br'_i$ to the branch $br_i$, negating the branch $br_i$ and generating the corresponding program behavior slices; and S605) outputting all the generated program behavior slices as the uncovered program behavior slices on the path.

Further improvement of the present invention is in that, the step of generating the new test path in the Step S9) comprises:

S901) selecting a path behavior slice from the uncovered program behavior slices by using the breadth first algorithm;

S902) calculating program behavior slice condition and deleting the program behavior slice from the uncovered program behavior slices;

S903) guiding symbolic execution by the branch statement condition of the program behavior slice, calculating all paths conforming to the branch statement condition by constraint solution;

S904) judging whether the path is validly executable, if yes, going to Step S905); otherwise going to Step S906);

S905) outputting a path conforming to the program behavior slice condition; and

S906) outputting, including: when no valid execution path is generated, then going to the Step S8), wherein the program behavior slice condition refers to a set of all the conditional statements in the program behavior slices.

Compared with the existing technique, the present invention may have the following advantages. The present invention provides a method of test cases reduction based on program behavior slices. In the case that there is no need to scan all program paths, a test suite capable of covering all program behaviors is generated to relieve the state-space explosion problem confronted by program tests. In the present invention, during a static analysis stage, analyzing a control flow and an information flow of a program according to under the test program, extracting data dependence and control dependence of the program and calculating potential dependence of the program; on the basis of the control dependence, the data dependence and the potential dependence, defining and constructing combination dependence of the program; during a dynamic execution stage, according to an execution path and the dependence relation, calculating program behavior slices covered by the path and program behavior slices uncovered by the path; guiding symbolic execution to generate a path capable of covering new program slices according to the uncovered program behavior slices; the test cases are generated by iteration, so as to ensure that the generated test suite is able to cover all the program behavior slices and to achieve the same test effect as the path coverage. Compared with the existing symbolic execution technique, the solution of the present invention can ensure the validity of the test suite, while at the same time reducing the number of the generated test cases greatly.

BRIEF DESCRIPTION OF THE DRAWINGS

FIG. 5 is a schematic diagram of an example program for an illustrative purpose of the specific embodiment.

DETAILED DESCRIPTION OF THE EMBODIMENTS

Embodiments of the present invention will be described in detail in conjunction with the accompanying figures and examples. An under-the-test program is shown in FIG. 5. The execution path is expressed as branch statements in the path. Assuming that an execution path passes two branch statements, i.e., 2F, 3T, it may be indicated as [2F, 3T].

Step S1: according to input program and by using data flow analysis method, extracting control dependence and data dependence of the program. The result is shown in TABLE 1.

TABLE 1

Static Dependence Table

| Dependence Type | Dependence Relation |
|---|---|
| Control Dependence | (6T, 7)(8T, 9)(10T, 11)(12T, 13) |
| Data Dependence | (1, 11, a)(2, 11, b)(3, 14, c)(4, 15, d)(7, 11, a) (9, 11, b)(11, 14, c)(13, 15, d) |
| Potential Dependence | (6F, 11, a)(8F, 11T, b)(10F, 14, c)(12F, 15, d) |
| Combination Dependence | (1, 2, a)(1, 6F, a)(1, 8F, a)(1, 8T, a)(1, 9, a)(1, 10T, a) (2, 6T, b)(2, 7, b)(2, 8F, b) (2, 10T, b)(6F, 8F, a)(6F, 8T, a)(6F, 9, a)(6F, 10T, a) (8F, 10T, b)(9, 11, b) |

Step S2: according to the control dependence and the data dependence of the program, calculating potential dependence of the program in a program control flow graph. A result is shown in TABLE 1.

Figure 1:
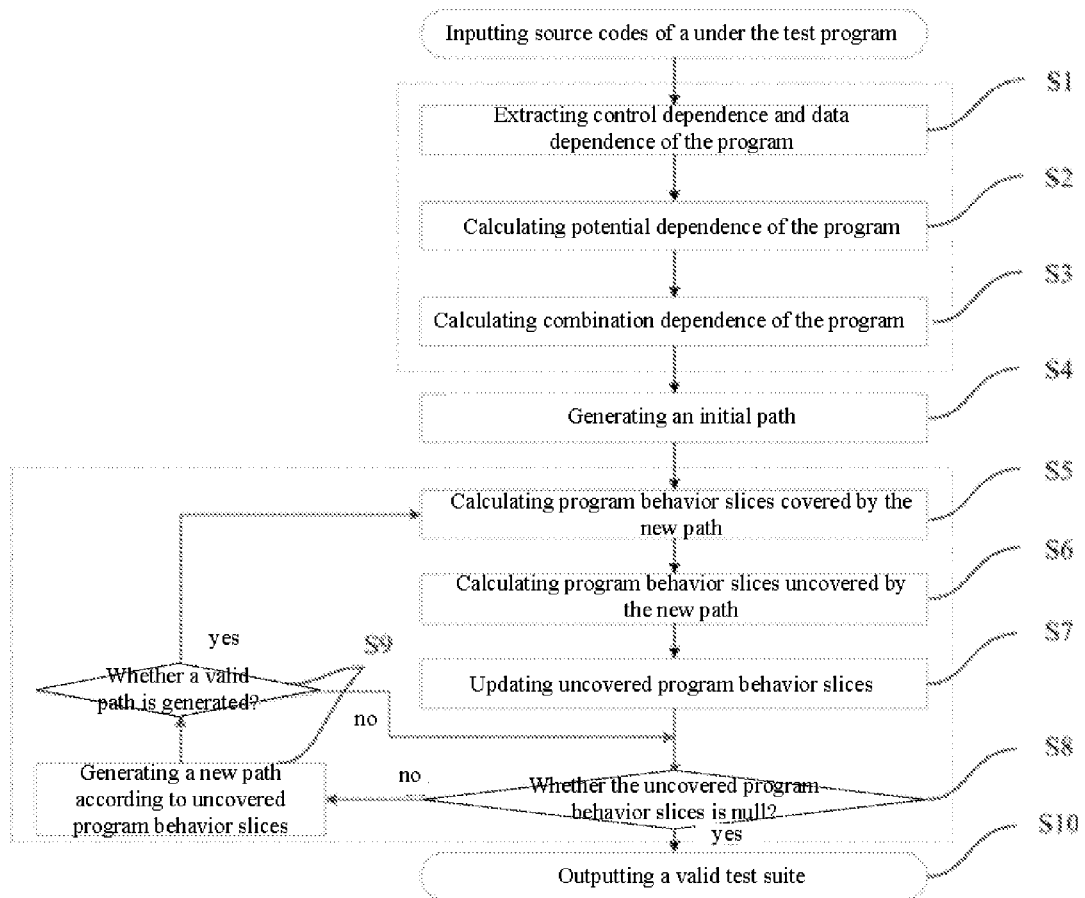
FIG. 1 is an overall flow chart of a method of test cases reduction of the present inventive.
Figure 2:
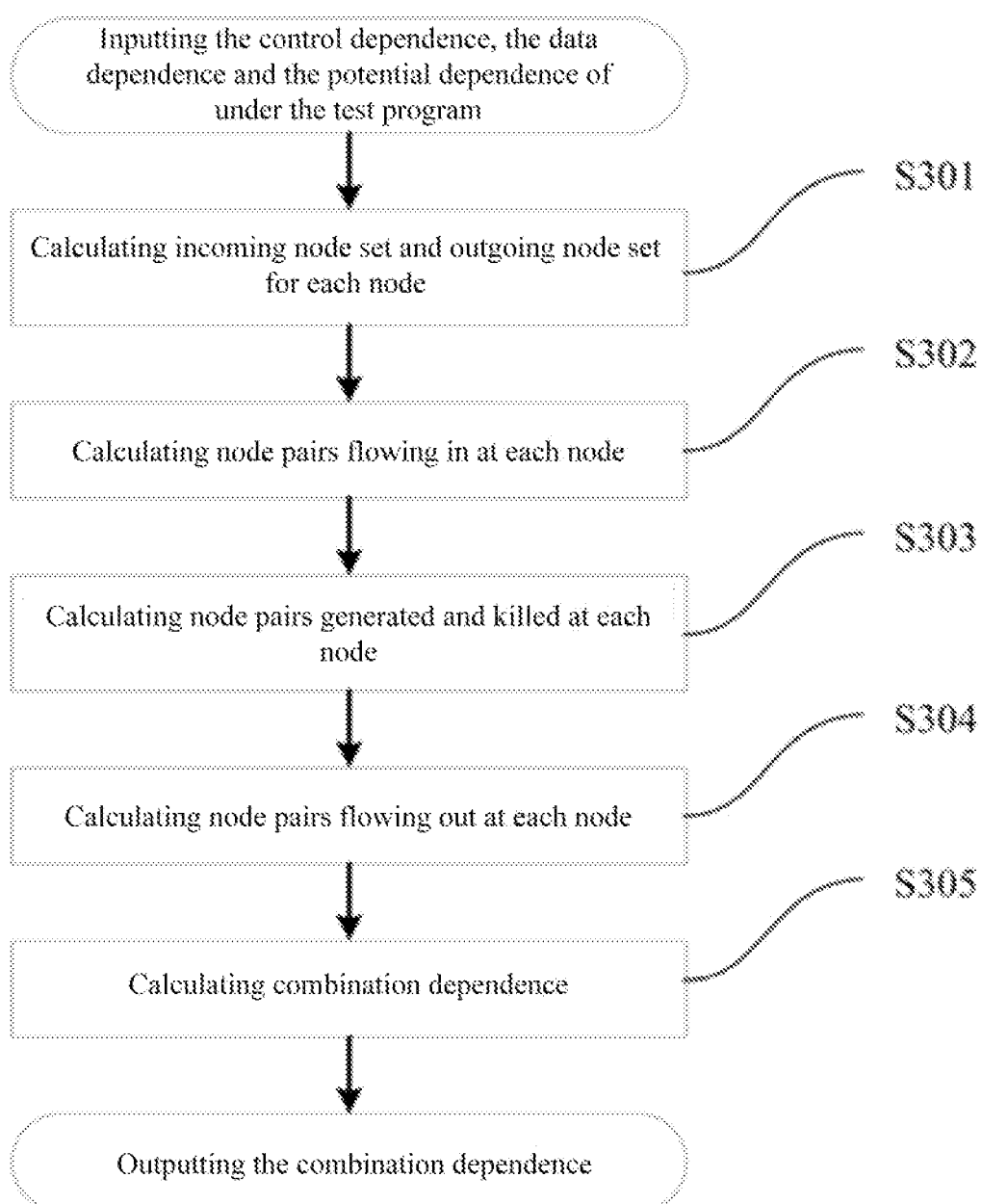
FIG. 2 is a flow chart of a method for calculating combination dependence.

Step S3: according to the control dependence, the data dependence and the potential dependence of the program, constructing combination dependence of the program in the program control flow graph. The control flow graph is shown in FIG. 2, and particularly comprises:

Step S301: on the basis of the data flow analysis method, calculating a statement set that each statement of the program is able to reach, that is each statement of the program serving as a node and calculating incoming node set and outgoing node set for each node. A result thereof is shown in TABLE 2.

TABLE 2

In-flow and Out-flow Statement Set Table

| No. | In-flow Statement Set | Out-flow Statement Set |
|---|---|---|
| 1 | N/A | 1 |
| 2 | 1 | 1, 2 |
| 3 | 1, 2 | 1, 2, 3 |
| 4 | 1, 2, 3 | 1, 2, 3, 4 |
| 5 | 1, 2, 3, 4 | 1, 2, 3, 4 |
| 6 | 1, 2, 3, 4 | 1, 2, 3, 4, 6T, 6F |
| 7 | 1, 2, 3, 4, 6T | 2, 3, 4, 6T, 7 |
| 8 | 1, 2, 3, 4, 6T, 6F, 7 | 1, 2, 3, 4, 6T, 6F, 7, 8T, 8F |
| 9 | 1, 2.3, 4, 6T, 6F, 7, 8T | 1, 3, 4, 6T, 6F, 7, 8T, 9 |
| 10 | 1, 2, 3, 4, 6T, 6F, 7, 8T, 8F, 9 | 1, 2, 3, 4, 6T, 6F, 7, 8T, 8F, 9, 10T, 10F, |
| 11 | 1, 2, 3, 4, 6T, 6F, 7, 8T, 8F, 9, 10T | 1, 2, 4, 6T, 6F, 7, 8T, 8F, 9, 10T, 11 |
| 12 | 1, 2, 3, 4, 6T, 6F, 7, 8T, 8F, 9, 10T, 10F, 11 | 1, 2, 3, 4, 6T, 6F, 7, 8T, 8F, 9, 10T, 10F, 11, 12T, 12F |
| 13 | 1, 2, 3, 4, 6T, 6F, 7, 8T, 8F, 9, 10T, 10F, 11, 12T | 1, 2, 3, 6T, 6F, 7, 8T, 8F, 9, 10T, 10F, 11, 12T, 13 |
| 14 | 1, 2, 3, 4, 6T, 6F, 7, 8T, 8F, 9, 10T, 10F, 11, 12T, 12F, 13 | 1, 2, 3, 4, 6T, 6F, 7, 8T, 8F, 9, 10T, 10F, 11, 12T, 12F, 13, 14 |
| 15 | 1, 2, 3, 4, 6T, 6F, 7, 8T, 8F, 9, 10T, 10F, 11, 12T, 12F, 13, 14 | 1, 2, 3, 4, 6T, 6F, 7, 8T, 8F, 9, 10T, 10F, 11, 12T, 12F, 13, 14, 15 |

Step S302: calculating node pairs flowing in at each node, i.e., calculating the sum of output node pairs of an immediate previous node to the present node. A result thereof is shown in TABLE 3.

TABLE 3

Incoming Node Pair Table

| No. | Incoming Node Pair |
|---|---|
| 1 | N/A |
| 2 | N/A |
| 3 | (1, 2) |
| 4 | (1, 2), (1, 3), (2, 3) |
| 5 | N/A |
| 6 | (1, 2), (1, 3), (1, 4), (2, 3), (2, 4), (3, 4) |
| 7 | (1, 2), (1, 3), (1, 4), (1, 6T), (2, 3), (2, 4), (2, 6T), (3, 4), (3, 6T), (4, 6T) |
| 8 | (1, 2), (1, 3), (1, 4), (1, 6F), (2, 3), (2, 4), (2, 6F), (2, 7), (3, 4), (3, 6F), (3, 7), (4, 6F), (4, 7) |
| 9 | (1, 2), (1, 3), (1, 4), (1, 6F), (1, 8T), (2, 3), (2, 4), (2, 6F), (2, 7), (2, 8T), (3, 4), (3, 6F), (3, 7), (3, 8T), (4, 6F), (4, 7), (4, 8T), (6F, 8T), (7, 8T) |
| 10 | (1, 2), (1, 3), (1, 4), (1, 6F), (1, 8F), (1, 9), (2, 3), (2, 4), (2, 6F), (2, 7), (2, 8F), (3, 4), (3, 6F), (3, 7), (3, 8F), (3, 9), (4, 6F), (4, 7), (4, 8F), (4, 9), (6F, 8F), (6F, 9), (7, 8F), (7, 9) |
| 11 | (1, 10T), (1, 2), (1, 3), (1, 4), (1, 6F), (1, 8F), (1, 9), (2, 10T), (2, 3), (2, 4), (2, 6F), (2, 7), (2, 8F), (3, 10T), (3, 4), (3, 6F), (3, 7), (3, 8F), (3, 9), (4, 10T), (4, 6F), (4, 7), (4, 8F), (4, 9), (6F, 10T), (6F, 8F), (6F, 9), (7, 10T), (7, 8F), (7, 9), (8F, 10T), (9, 10T) |
| 12 | (1, 10F), (1, 11), (1, 2), (1, 3), (1, 4), (1, 6F), (1, 8F), (1, 9), (2, 10F), (2, 11), (2, 3), (2, 4), (2, 6F), (2, 7), (2, 8F), (3, 10F), (3, 4), (3, 6F), (3, 7), (3, 8F), (3, 9), (4, 10F), (4, 11), (4, 6F), (4, 7), (4, 8F), (4, 9), (6F, 10F), (6F, 11), (6F, 8F), (6F, 9), (7, 10F), (7, 11), (7, 8F), (7, 9), (8F, 10F), (8F, 11), (9, 10F), (9, 11) |
| 13 | (1, 10F), (1, 11), (1, 12T), (1, 2), (1, 3), (1, 4), (1, 6F), (1, 8F), (1, 9), (10F, 12T), (11, 12T), (2, 10F), (2, 11), (2, 12T), (2, 3), (2, 4), (2, 6F), (2, 7), (2, 8F), (3, 10F), (3, 12T), (3, 4), (3, 6F), (3, 7), (3, 8F), (3, 9), (4, 10F), (4, 11), (4, 12T), (4, 6F), (4, 7), (4, 8F), (4, 9), (6F, 10F), (6F, 11), (6F, 12T), (6F, 8F), (6F, 9), (7, 10F), (7, 11), (7, 12T), (7, 8F), (7, 9), (8F, 10F), (8F, 11), (8F, 12T), (9, 10F), (9, 11), (9, 12T) |
| 14 | (1, 10F), (1, 11), (1, 12F), (1, 13), (1, 2), (1, 3), (1, 4), (1, 6F), (1, 8F), (1, 9), (10F, 12F), (10F, 13), (11, 12F), (11, 13), (2, 10F), (2, 11), (2, 12F), (2, 13), (2, 3), (2, 4), (2, 6F), (2, 7), (2, 8F), (3, 10F), (3, 12F), (3, 13), (3, 4), (3, 6F), (3, 7), (3, 8F), (3, 9), (4, 10F) (4, 11), (4, 12F), (4, 6F), (4, 7), (4, 8F), (4, 9), (6F, 10F), (6F, 11), (6F, 12F), (6F, 13), (6F, 8F), (6F, 9), (7, 10F), (7, 11), (7, 12F), (7, 13), (7, 8F), (7, 9), (8F, 10F), (8F, 11), (8F, 12F), (8F, 13), (9, 10F), (9, 11), (9, 12F), (9, 13) |
| 15 | (1, 10F), (1, 11), (1, 12F), (1, 13), (1, 14), (1, 2), (1, 3), (1, 4), (1, 6F), (1, 8F), (1, 9), (10F, 12F), (10F, 13), (10F, 14), (11, 12F), (11, 13), (11, 14), (12F, 14), (13, 14), (2, 10F), (2, 11), (2, 12F), (2, 13), (2, 14), (2, 3), (2, 4), (2, 6F), (2, 7), (2, 8F), (3, 10F), (3, 12F), (3, 13), (3, 14), (3, 4), (3, 6F), (3, 7), (3, 8F), (3, 9), (4, 10F), (4, 11), (4, 12F), (4, 14), (4, 6F), (4, 7), (4, 8F), (4, 9), (6F, 10F), (6F, 11), (6F, 12F), (6F, 13), (6F, 14), (6F, 8F), (6F, 9), (7, 10F), (7, 11), (7, 12F), (7, 13), (7, 14), (7, 8F), (7, 9), (8F, 10F), (8F, 11), (8F, 12F), (8F, 13), (8F, 14), (9, 10F), (9, 11), (9, 12F), (9, 13), (9, 14) |

Step S303: calculating node pairs generated and killed at each node. Nodes flowing in the present node are one-to-one combined to form node pairs with the present node. If either one node of the incoming node pair is redefined by the present node, then the node pair may redefined by the present node kills hereby.

Step S304: calculating node pairs flowing out at each node, i.e., adding generated node pairs to the incoming node pairs at the present node and then subtracting the node pairs killed hereby. A result thereof is shown in TABLE 4.

TABLE 4

Outgoing Node Pair Table

| No. | Outgoing Node Pair |
|---|---|
| 1 | N/A |
| 2 | (1, 2) |
| 3 | (1, 2), (1, 3), (2, 3) |
| 4 | (1, 2), (1, 3), (1, 4), (2, 3), (2, 4), (3, 4) |
| 5 | N/A |
| 6 | (1, 2), (1, 3), (1, 4), (1, 6F), (1, 6F), (1, 6T), (2, 3), (2, 4), (2, 6F), (2, 6F), (2, 6T), (3, 4), (3, 6F), (3, 6F), (3, 6T), (4, 6F), (4, 6F), (4, 6T) |
| 7 | (2, 3), (2, 4), (2, 6T), (2, 7), (3, 4), (3, 6T), (3, 7), (4, 6T), (4, 7), (6T, 7) |
| 8 | (1, 2), (1, 3), (1, 4), (1, 6F), (1, 8F), (1, 8F), (1, 8T), (2, 3), (2, 4), (2, 6F), (2, 7), (2, 8F), (2, 8F), (2, 8T), (3, 4), (3, 6F), (3, 7), (3, 8F), (3, 8F), (3, 8T), (4, 6F), (4, 7), (4, 8F), (4, 8F), (4, 8T), (6F, 8F), (6F, 8F), (6F, 8T), (7, 8F), (7, 8F), (7, 8T) |
| 9 | (1, 3), (1, 4), (1, 6F), (1, 8T), (1, 9), (3, 4), (3, 6F), (3, 7), (3, 8T), (3, 9), (4, 6F), (4, 7), (4, 8T), (4, 9), (6F, 8T), (6F, 9), (7, 8T), (7, 9), (8T, 9) |
| 10 | (1, 10F), (1, 10F), (1, 10T), (1, 2), (1, 3), (1, 4), (1, 6F), (1, 8F), (1, 9), (2, 10F), (2, 10F), (2, 10T), (2, 3), (2, 4), (2, 6F), (2, 7), (2, 8F), (3, 10F), (3, 10F), (3, 10T), (3, 4), (3, 6F), (3, 7), (3, 8F), (3, 9), (4, 10F), (4, 10F), (4, 10T), (4, 6F), (4, 7), (4, 8F), (4, 9), (6F, 10F), (6F, 10F), (6F, 10T), (6F, 8F), (6F, 9), (7, 10F), (7, 10F), (7, 10T), (7, 8F), (7, 9), (8F, 10F), (8F, 10F), (8F, 10T), (9, 10F), (9, 10F), (9, 10T) |
| 11 | (1, 10T), (1, 11), (1, 2), (1, 4), (1, 6F), (1, 8F), (1, 9), (10T, 11), (2, 10T), (2, 11), (2, 4), (2, 6F), (2, 7), (2, 8F), (4, 10T), (4, 11), (4, 6F), (4, 7), (4, 8F), (4, 9), (6F, 10T), (6F, 11), (6F, 8F), (6F, 9), (7, 10T), (7, 11), (7, 8F), (7, 9), (8F, 10T), (8F, 11), (9, 10T), (9, 11) |
| 12 | (1, 10F), (1, 11), (1, 12F), (1, 12F), (1, 12T), (1, 2), (1, 3), (1, 4), (1, 6F), (1, 8F), (1, 9), (10F, 12F), (10F, 12F), (10F, 12T), (11, 12F), (11, 12F), (11, 12T), (2, 10F), (2, 11), (2, 12F), (2, 12F), (2, 12T), (2, 3), (2, 4), (2, 6F), (2, 7), (2, 8F), (3, 10F), (3, 12F), (3, 12F), (3, 12T), (3, 4), (3, 6F), (3, 7), (3, 8F), (3, 9), (4, 10F), (4, 11), (4, 12F), (4, 12F), (4, 12T), (4, 6F), (4, 7), (4, 8F), (4, 9), (6F, 10F), (6F, 11), (6F, 12F), (6F, 12F), (6F, 12T), (6F, 8F), (6F, 9), (7, 10F), (7, 11), (7, 12F), (7, 12F), (7, 12T), (7, 8F), (7, 9), (8F, 10F), (8F, 11), (8F, 12F), (8F, 12F), (8F, 12T), (9, 10F), (9, 11), (9, 12F), (9, 12F), (9, 12T) |
| 13 | (1, 10F), (1, 11), (1, 12F), (1, 13), (1, 2), (1, 3), (1, 6F), (1, 8F), (1, 9), (10F, 12T), (10F, 13), (11, 12T), (11, 13), (12T, 13), (2, 10F), (2, 11), (2, 12T), (2, 13), (2, 3), (2, 6F), (2, 7), (2, 8F), (3, 10F), (3, 12T), (3, 13), (3, 6F), (3, 7), (3, 8F), (3, 9), (6F, 10F), (6F, 11), (6F, 12T), (6F, 13), (6F, 8F), (6F, 9), (7, 10F), (7, 11), (7, 12T), (7, 13), (7, 8F), (7, 9), (8F, 10F), (8F, 11), (8F, 12T), (8F, 13), (9, 10F), (9, 11), (9, 12T), (9, 13) |
| 14 | (1, 10F), (1, 11), (1, 12F), (1, 13), (1, 14), (1, 2), (1, 3), (1, 4), (1, 6F), (1, 8F), (1, 9), (10F, 12F), (10F, 13), (10F, 14), (11, 12F), (11, 13), (11, 14), (12F, 14), (13, 14), (2, 10F), (2, 11), (2, 12F), (2, 13), (2, 14), (2, 3), (2, 4), (2, 6F), (2, 7), (2, 8F), (3, 10F), (3, 12F), (3, 13), (3, 14), (3, 4), (3, 6F), (3, 7), (3, 8F), (3, 9), (4, 10F), (4, 11), (4, 12F), (4, 14), (4, 6F), (4, 7), (4, 8F), (4, 9), (6F, 10F), (6F, 11), (6F, 12F), (6F, 13), (6F, 14), (6F, 8F), (6F, 9), (7, 10F), (7, 11), (7, 12F), (7, 13), (7, 14), (7, 8F), (7, 9), (8F, 10F), (8F, 11), (8F, 12F), (8F, 13), (8F, 14), (9, 10F), (9, 11), (9, 12F), (9, 13), (9, 14) |
| 15 | (1, 10F), (1, 11), (1, 12F), (1, 13), (1, 14), (1, 15), (1, 2), (1, 3), (1, 4), (1, 6F), (1, 8F), (1, 9), (10F, 12F), (10F, 13), (10F, 14), (10F, 15), (11, 12F), (11, 13), (11, 14), (11, 15), (12F, 14), (12F, 15), (13, 14), (13, 15), (14, 15), (2, 10F), (2, 11), (2, 12F), (2, 13), (2, 14), (2, 15), (2, 3), (2, 4), (2, 6F), (2, 7), (2, 8F), (3, 10F), (3, 12F), (3, 13), (3, 14), (3, 15), (3, 4), (3, 6F), (3, 7), (3, 8F), (3, 9), (4, 10F), (4, 11), (4, 12F), (4, 14), (4, 15), (4, 6F), (4, 7), (4, 8F), (4, 9), (6F, 10F), (6F, 11), (6F, 12F), (6F, 13), (6F, 14), (6F, 15), (6F, 8F), (6F, 9), (7, 10F), (7, 11), (7, 12F), (7, 13), (7, 14), (7, 15), (7, 8F), (7, 9), (8F, 10F), (8F, 11), (8F, 13), (8F, 12F), (8F, 14), (8F, 15), (9, 10F), (9, 11), (9, 12F), (9, 13), (9, 14), (9, 15) |

Step S305: calculating the combination dependence, in which for an incoming node pair at a node, if both nodes of the node pair has the control dependence, the data dependence, the potential dependence or the combination dependence with the present node, then it is considered that both nodes of the node pair have the combination dependence. A result thereof is shown in TABLE 1.

Step S4: randomly generating an initial path by using a symbolic execution method. Assuming that the generated test case is (0,−2,1,3), corresponding path may be [6T,8T,10T, 12T]. The test case (0,−2,1,3) may be stored in a valid test suite, as shown in Line 1 of FIG. 5.

TABLE 5

Valid Test Suite Table

| No. | Guide-Generated Program Behavior Slices | Test Case | Execution Path | Covered Program Behavior Slices | Uncovered Program Behavior Slices |
|---|---|---|---|---|---|
| 1 | N/A | (0, −2, 1, 3) | [1, 2, 3, 4, 5, 6T, 7, 8T, 9, 10T, 11, 12T, 13, 14, 15] | [1]<br>[1, 2]<br>[1, 2, 6T]<br>[1, 2, 6T, 7]<br>[1, 2, 6T, 7, 8T]<br>[1, 2, 6T, 7, 8T, 9]<br>[1, 2, 6T, 7, 8T, 9, 10T]<br>[1, 2, 6T, 7, 8T, 9, 10T, 11]<br>[1, 2, 6T, 7, 8T, 9, 10T, 11, 14]<br>[3]<br>[4]<br>[4, 12T]<br>[4, 12T, 13]<br>[4, 12T, 13, 15] | Possessed: N/A<br>Added: [6F]<br>[6T, 8F]<br>[10F]<br>[12F] |
| 2 | [6F] | (2, 0, 1, 3) | [1, 2, 3, 4, 5, 6F, 8T, 9, 10T, 11, 12T, 13, 14, 15] | [1, 2, 6F]<br>[1, 2, 6F, 8T]<br>[1, 2, 6F, 8T, 9]<br>[1, 2, 6F, 8T, 9, 10T]<br>[1, 2, 6F, 8T, 9, 10T, 11]<br>[1, 2, 6F, 8T, 9, 10T, 11, 14] | Possessed:<br>[6F](Deleted)<br>[6T, 8F]<br>[6F]<br>[12F]<br>Added:<br>[6F, 8F] |
| 3 | [6T, 8F] | (0, −2, −1, 3) | [1, 2, 3, 4, 5, 6T, 7, 8F, 10T, 11, 12T, 13, 14, 15] | [1, 2, 6T, 7, 8F]<br>[1, 2, 6T, 7, 8F, 10T]<br>[1, 2, 6T, 7, 8F, 10T, 11]<br>[1, 2, 6T, 7, 8F, 10T, 11, 14] | Possessed:<br>[6T, 8F](Deleted)<br>[10F]<br>[12F]<br>[6F, 8F]<br>Added: N/A |
| 4 | [6F, 8F] | (2, 0, −1, 3) | [1, 2, 3, 4, 5, 6F, 8F, 10T, 11, 12T, 13, 14, 15] | [1, 2, 6F, 8F]<br>[1, 2, 6F, 8F, 10T]<br>[1, 2, 6F, 8F, 10T, 11]<br>[1, 2, 6F, 8F, 10T, 11, 14] | Possessed:<br>[10F]<br>[12F]<br>[6F, 8F](Deleted)<br>Added: N/A |
| 5 | [10F] | (0, −1, 1, 3) | [1, 2, 3, 4, 5, 6T, 7, 8T, 9, 10F, 12T, 13, 14, 15] | [3, 10F]<br>[3, 10F, 14] | Possessed:<br>[10F](Deleted)<br>[12F]<br>Added: N/A |
| 6 | [12F] | (0, −2, 1, 0) | [1, 2, 3, 4, 5, 6T, 7, 8T, 9, 10T, 11, 12F, 14, 15] | [4, 12F]<br>[4, 12F, 15] | Possessed:<br>[12F](Deleted)<br>Added: N/A |

Step S5: calculating program behavior slices covered by the new path (wherein the initial path is executed at the first time), i.e., for each branch node executed by the path, calculating the program behavior slices on the path. Herein, the program behavior slices of a node $n_i$ on the path contains all nodes conforming to the following characters: the nodes have an interact relation with the node $n_i$ on the path by the control dependence, the data dependence, the potential dependence, the combination dependence or their transition. An analysis result of each loop is shown in Column 5 of TABLE 5. Taking the initial path as an example, the program behavior slices covered thereby are shown in Line 1, Column 5 of TABLE 5.

The program behavior slices are defined as follows: assuming a path $\epsilon$ and a node $n_i$ on the path are given, the program behavior slices of the node $n_i$ on the path $\epsilon$ refer to all nodes which are capable of influencing the node $n_i$ on the path. Therefore, the program behavior slices are a kind of partition of the program path, and the program behavior slices at each node on the path are necessarily calculated. Intuitively, the partition of path by the program behavior slices is the same as the partition of path by the program statements, in which the same program behavior slices may be included in a plurality of the paths. In this case, it is required to generate only one of paths such that the number of paths may be greatly reduced. Further, as the path coverage, program behavior slice coverage is capable of detecting the same program behaviors. Therefore, as the path coverage may detect errors, the program behavior slice coverage may also detect errors.

Figure 3:
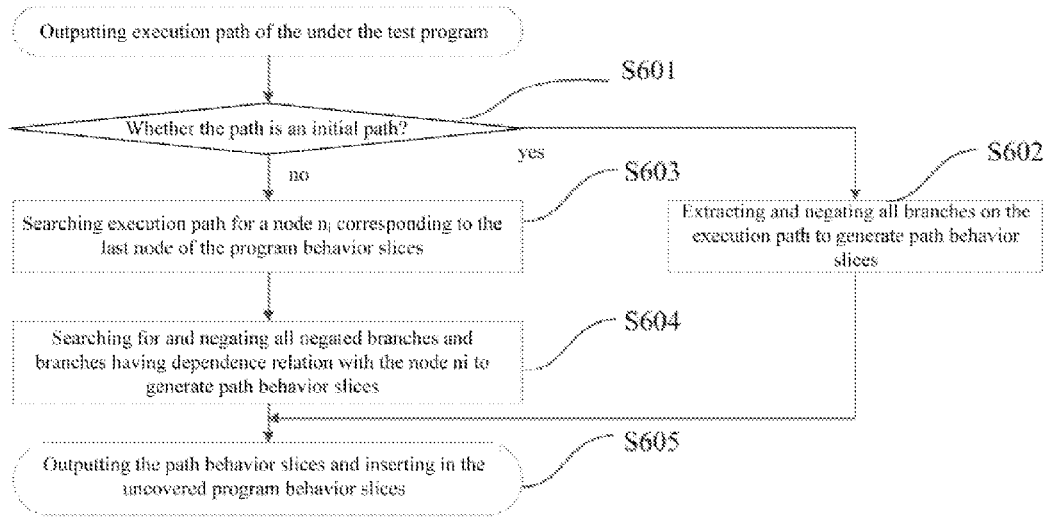
FIG. 3 is a flow chart of a method for generating program behavior slices.

Step S6: calculating program behavior slices uncovered by the new path (wherein the initial path is executed at the first time), i.e., according to the dependence relation, calculating all the branches required to be negated on the path and calculating the program behavior slices of the negated branches on the path. The flow chart is shown in FIG. 3, and covered paths in the paths of each loop are shown in "added" in Column 6 of TABLE 5. The calculation of the uncovered program behavior slices is as follows:

S601) judging whether the path is the initial path, if yes, going to Step S602), otherwise going to Step S603);

S602) negating all branches on the path, generating corresponding program behavior slices, and going to Step S605);

S603) if the path $\epsilon$ is generated by guide of the program behavior slices, searching the path $\epsilon$ for a node $n_i$ corresponding to the last node of the program behavior slices;

S604) for an arbitrary branch node br on the path $\epsilon$, if there exist the control dependence, the data dependence, the potential dependence, the combination dependence or their transition dependence on the path $\epsilon$ between the nodes $n_i$ and the negated branch $br'_i$ to the branch $br_j$, negating the branch $br_j$ and generating the corresponding program behavior slices; and S605) outputting all the generated program behavior slices as the uncovered program behavior slices on the path.

Taking the initial path as an example, the particular flow may comprise:

Step S601: it being determined that the path is the initial execution path, and going to S602;

Step S602: negating all branches on the path, generating corresponding program behavior slices, and going to S605; and Step S605: acquiring uncovered program behavior slices [6F], [6T,8F], [10F], [12F].

Step S7: according to the detected covered and uncovered program behavior slices on the path, updating uncovered program behavior slices, as shown in Column 6 of TABLE 5. Herein, "Possessed" refers to all the slices in the originally uncovered program behavior slices; wherein, a slice marked by "(Deleted)" in the originally uncovered program behavior slices means this slice is covered by a new path; "Added" means this slice is an uncovered program behavior slice detected according to the new path.

Step S8: judging whether the uncovered program behavior slices is null, if there are no uncovered program behavior slices, going to Step S10); otherwise going to Step S9). On the initial path, the uncovered program behavior slices is not null, as shown in 1$^{st}$ Record, Column 6 of TABLE 5, and thus the process goes to Step S9; in the 6$^{th}$ loop, the uncovered program behavior slices is null, as shown in 6$^{th}$ Record, Column 6 of TABLE 5, and thus the loop ends and the process goes to Step S10.

Figure 4:
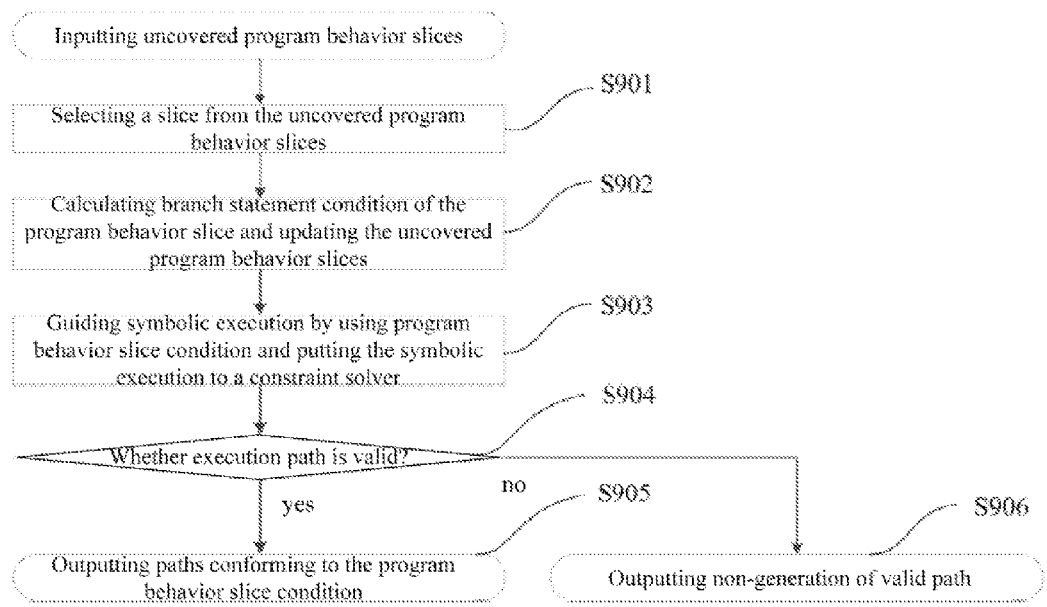
FIG. 4 is a flow chart of a method for generating paths in accordance with program behavior slices.

Step S9: selecting one piece of program behavior slices from the uncovered program behavior slices according to breadth first algorithm, guiding symbolic execution to generate a new test path, if the test path is valid, storing its corresponding test case to the test suite and going to the Step S5); if no valid path is generated, deleting the selected program behavior slice from the uncovered program behavior slices and going to the Step S8). As shown in the flow chart of FIG. 4, the method for generating the path according to the program behavior slices is as follows:

S901) selecting a path behavior slice from the uncovered program behavior slices by using the breadth first algorithm;

S902) calculating program behavior slice condition and deleting the program behavior slice from the uncovered program behavior slices;

S903) guiding symbolic execution by the branch statement condition of the program behavior slice, calculating all paths conforming to the branch statement condition by constraint solution;

S904) judging whether the path is validly feasible, if yes, going to Step S905); otherwise going to Step S906);

S905) outputting a path conforming to the program behavior slice condition; and

S906) outputting, including: when no valid execution path is generated, then going to the Step S8).

Herein, the program behavior slice condition refers to a set of all the conditional statements in the program behavior slices.

Taking the initial path as an example, the particular flow may comprise:

Step S901: by using the breadth first algorithm, selecting [6F] from the uncovered program behavior slices (as shown in 1$^{st}$ Record, Column 6 of TABLE 5).

Step S902: calculating the program behavior slice condition with False branch selected by the branch statement in Line 6; and deleting the slice [6F] from the uncovered program behavior slices, as shown in 1$^{st}$ Record, Column 6 of TABLE 5.

Step S903: with False branch selected by the branch statement in Line 6 as a constraint condition, solving by a constraint solver.

Step S904: generating a test case (2,0,1,3) corresponding to the execution path [6F,8T,10T,12T], and storing the test case (2,0,1,3) to a valid test suite.

Step S905: outputting the valid path and the test case.

Above steps may be repeated, such that covered and uncovered program behavior slices may be newly detected and test paths may be newly generated. In the present invention, after the example program is executed 6 loops, all records in the uncovered program behavior slices will be cleared, as the detailed process thereof is shown in TABLE 5. There are 6 valid test paths are generated in the 6 loops, which correspond to 6 test cases and which cover all the program behavior slices.

Step S10): outputting the valid test suite which covers all the program behavior slices of the target program.

Compared with the existing symbolic execution method, the number of generated test cases in the embodiment is only one third of the existing symbolic execution method, in such a manner that the validity of the test suite may be ensured while the number of the generated test cases is remarkably reduced, with the same test effect as the existing method. In the case of a program have a great deal of branches, the number of generated test cases according to the present invention is only around one percent of the existing symbolic execution method, remarkably reducing the number of generated test case.

The invention claimed is:

1. A method of test cases reduction based on program behavior slices, comprising:
S1) analyzing control flow and information flow of a under test program and extracting a control dependence and a data dependence of the under test program, according to the under test program and by using a static program analysis method;
S2) calculating a potential dependence of the under test program, according to the control dependence and the data dependence of the under test program;
S3) constructing a combination dependence of the under test program in a program control flow graph, according to the control dependence, the data dependence and the potential dependence of the under test program;
S4) randomly generating an initial path by using a symbolic execution method, and storing a test case corresponding to the initial path to a valid test suite;
S5) calculating a program behavior slices covered by the new path, wherein the initial path is executed at the first time, and the calculation includes: for each branch node executed by the path, calculating the program behavior slices on the path, wherein, the program behavior slices of a node m on the path contains all nodes conforming to the following characters: the nodes have an interact relation on the path with the node m by the control dependence, the data dependence, the potential dependence, the combination dependence or their transition;

S6) calculating a program behavior slices uncovered by the new path wherein the initial path is executed at the first time, and the calculation includes: according to the dependence relation, calculating all the branches required to be negated on the path and calculating the program behavior slices of the negated branches on the path;

S7) updating the uncovered program behavior slices, including: deleting the program behavior slices covered by the new path and adding program behavior slices uncovered by the new path;

S8) if the uncovered program behavior slices is null, i.e., there are no uncovered program behavior slices, going to Step S10); otherwise, going to Step S9);

S9) selecting one piece of program behavior slices from the uncovered program behavior slices according to breadth first algorithm, guiding symbolic execution to generate a test path, if the test path is valid, storing its corresponding test case to the test suite and going to the Step S5); if no valid path is generated, deleting the selected program behavior slice from the uncovered program behavior slices and going to the Step S8); and S10) outputting the valid test suite which covers all the program behavior slices of the program.

2. The method of test cases reduction according to claim 1, wherein, the potential dependence in the Step S2) is defined as follows: when a condition wherein a statement s1 and a statement s2 simultaneously conform to the following requirements, then there exists the potential dependence between the conditional statement s1 and the statement s2: 1) when the conditional statement s1 invokes a branch br, a statement s'1 satisfies with a requirement in which there exists the direct or indirect control dependence between the statement s1 and the statement s'1 through the branch br and there exists the data dependence between the statement s'1 and the statement s2; 2) when the conditional statement s1 invokes a negated branch br' of the branch br, no statement s'1 satisfies with a requirement in which there exists the direct or indirect control dependence between the statement s1 and the statement s'1 through the branch br' and there exists the data dependence between the statement s'1 and the statement s2, wherein the control dependence and the data dependence describe an influence on the statement s2 when the statement s1 is executed, while the potential dependence indicates an influence on the statement s2 when the non-execution of the statement s'1 is controlled by the statement s1.

3. The method of test cases reduction according to claim 1, wherein, the combination dependence in the Step S3) is defined as follows: when a statement s1 and a statement s2 simultaneously conform to the following three requirements, there exists the combination dependence between the statement s1 and the statement s2: 1) there is a path from the statement s1 through the statement s2 to a statement s3; 2) on the path, there exists the dynamic data dependence, the potential dependence or the combination dependence between the statement s1 and the statement s3; 3) on the path, there exists the dynamic control, the data dependence, the potential dependence or the combination dependence between the statement s2 and the statement s3.

4. The method of test cases reduction according to claim 1, wherein, the step of constructing the combination dependence of the program in the control flow graph in the Step S3) further comprises:

S301) providing each statement of the program as a node and calculating incoming node set and outgoing node set for each node, on the basis of the data flow analysis method;

S302) calculating node pairs flowing in at each node, including: calculating the sum of output node pairs of an immediate previous node to the present node;

S303) calculating node pairs generated at each node, in which nodes flowing in the present node are one-to-one combined to form node pairs with the present node; calculating node pairs killed at each node, in which if either one node of the incoming node pair is redefined by the present node, then the node pair redefined by the present node kills hereby;

S304) calculating node pairs flowing out at each node, including: adding generated node pairs to the incoming node pairs at the present node and then subtracting the node pairs killed hereby; and S305) calculating the combination dependence, in which for an incoming node pair at a node, if both nodes of the node pair has the control dependence, the data dependence, the potential dependence or the combination dependence with the present node, then it is considered that both nodes of the node pair have the combination dependence.

5. The method of test cases reduction according to claim 1, wherein, the program behavior slices in the Step S5) is defined as follows: assuming that an execution path $\epsilon$ and a slice criterion node c on the path are given, the program behavior slice of the node c on the path $\epsilon$ contains nodes conforming to the following characters: the nodes have an interact relation with the node c on the path by the control dependence, the data dependence, the potential dependence, the combination dependence or their transition.

6. The method of test cases reduction according to claim 1, wherein, the uncovered program behavior slice in the Step S6) is defined as follows: assuming a path and a branch $br_i$ to be negated on the path are given, the program behavior slice of a branch $br'_i$ negated to the branch $br_i$ on the path constitutes a piece of uncovered program behavior slice; wherein the uncovered program behavior slice is configured to be calculated as follows:

S601) judging whether the path $\epsilon$ is the initial path, if yes, going to Step S602), otherwise going to Step S603);

S602) negating all branches on the path, generating corresponding program behavior slices, and going to Step S605);

S603) searching the path $\epsilon$ for a node $n_i$ corresponding to the last node of the program behavior slices, if the path $\epsilon$ is generated by guide of the program behavior slices;

S604) for an arbitrary branch node $br_i$ on the path $\epsilon$, negating the branch $br_i$ and generating the corresponding program behavior slices if there exist the control dependence, the data dependence, the potential dependence, the combination dependence or their transition dependence on the path $\epsilon$ between the nodes $n_i$ and the negated branch $br'_i$ to the branch $br_i$; and S605) outputting all the generated program behavior slices as the uncovered program behavior slices on the path.

7. The method of test cases reduction according to claim 1, wherein, the step of generating the new test path in the Step S9) comprises:

S901) selecting a path behavior slice from the uncovered program behavior slices by using the breadth first algorithm;

S902) calculating program behavior slice condition and deleting the program behavior slice from the uncovered program behavior slices;

S903) guiding symbolic execution by the branch statement condition of the program behavior slice, calculating all paths conforming to the branch statement condition by constraint solution;

S904) judging whether the path is validly executable, if yes, going to Step S905); otherwise going to Step S906);

S905) outputting a path conforming to the program behavior slice condition; and

S906) outputting, including: when no valid execution path is generated, then going to the Step S8), wherein the program behavior slice condition refers to a set of all the conditional statements in the program behavior slices.

* * * * *